United States Patent
Sillador (10) Patent No.: US 10,630,860 B2
(45) Date of Patent: Apr. 21, 2020

(54) IMAGE READING DEVICE AND METHOD FOR CONTROLLING IMAGE READING DEVICE

(71) Applicant: KYOCERA Document Solutions Inc., Osaka (JP)

(72) Inventor: Jennybelle Sillador, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/529,199

(22) Filed: Aug. 1, 2019

(65) Prior Publication Data

US 2020/0076979 A1  Mar. 5, 2020

(30) Foreign Application Priority Data

Sep. 5, 2018 (JP) .................................. 2018-166098

(51) Int. Cl.
  *H04N 1/00* (2006.01)
  *H04N 1/028* (2006.01)
  *H04N 1/047* (2006.01)

(52) U.S. Cl.
  CPC ..... *H04N 1/02815* (2013.01); *H04N 1/00482* (2013.01); *H04N 1/047* (2013.01)

(58) Field of Classification Search
  CPC . H04N 1/02815; H04N 1/00482; H04N 1/047
  USPC ....................................................... 358/1.13
  See application file for complete search history.

(56) References Cited

U.S. PATENT DOCUMENTS

| | | | | |
|---|---|---|---|---|
| 2005/0206968 A1* | 9/2005 | Sodeura | ............. | H04N 1/00002 358/474 |
| 2005/0213167 A1* | 9/2005 | Shiraishi | ............ | H04N 1/02815 358/474 |
| 2005/0280867 A1* | 12/2005 | Arai | ................... | H04N 1/00013 358/2.1 |
| 2014/0192386 A1* | 7/2014 | Ishida | ................ | H04N 1/00689 358/449 |
| 2018/0079247 A1* | 3/2018 | Aoyagi | .................. | B65H 37/04 |
| 2018/0220027 A1* | 8/2018 | Kusuhata | ........... | H04N 1/00689 |

FOREIGN PATENT DOCUMENTS

JP  2006-60510 A  3/2006

* cited by examiner

*Primary Examiner* — Allen H Nguyen
(74) *Attorney, Agent, or Firm* — Stein IP, LLC (57) ABSTRACT

An image sensor in an image reading device reads a document based on light from a lamp while a carriage is moving from one to the other side. An image data generation circuit generates read image data based on an analog image signal fed out from the image sensor. A controller senses the edge of the document in the read image data generated while the carriage is moving. On recognizing once or a plurality of times, while the carriage is moving, based on the result of sensing of the edge, that the reading of one placed sheet of the document is completed, the controller makes a moving mechanism stop the movement of the carriage and turns off the lamp.

9 Claims, 8 Drawing Sheets

IMAGE READING DEVICE AND METHOD FOR CONTROLLING IMAGE READING DEVICE

INCORPORATION BY REFERENCE

This application is based upon and claims the benefit of priority from the corresponding Japanese Patent Application No. 2018-166098 filed on Sep. 5, 2018, the entire contents of which are incorporated herein by reference.

BACKGROUND

The present disclosure relates to an image reading device that reads a placed document.

Some image reading devices include a contact glass (platen glass). A document is placed on the contact glass. The image reading device reads the document on the contact glass. One example as described above is known of technology for reading a document on a contact glass.

Specifically, in a known image forming apparatus, the width in the main scanning direction of a document placed on a document stage is sensed by an image sensor for reading images, and there are provided a means for emitting light toward an image sensor that is movable in the sub scanning direction of the document, a stopper for restricting the movement range of the light-emitting means, and a means for operation for specifying the stop position of the stopper. This structure is intended to accurately scan only a region corresponding to the size of a document with simple operation when a document of an irregular size is read.

A user places a document on the document stage. When the document placed on the document stage is read, a light source radiates light toward the document stage. A carriage includes the light source. The carriage moves in the sub scanning direction. As the carriage is moved in the sub scanning direction, the position of the reading line moves in the sub scanning direction. Through repeated reading (scanning) while the reading line is moving, the whole document placed on the document stage is read. A document smaller than a set reading range can be placed.

SUMMARY

According to one aspect of the present disclosure, an image reading device includes a document stage, a carriage, a moving mechanism, an image sensor, an image data generation circuit, and a controller. On the document stage, a document to be read is placed. The carriage includes a lamp radiating light toward the document stage during document reading. The moving mechanism moves the carriage, during reading, from one to the other of two opposite sides of the document stage in the sub scanning direction. The image sensor reads the document based on light from the lamp while the carriage is moving from one to the other side. The image data generation circuit generates read image data based on an analog image signal fed out from the image sensor. After document reading is started, the controller keeps on the lamp while the carriage is moving from one to the other side. The controller senses the edge of the document in the read image data generated while the carriage is moving. The controller recognizes, while the carriage is moving, based on the result of sensing of the edge, that the reading of one placed sheet of the document is completed. On recognizing once or a plurality of times that the reading of one placed sheet of the document is completed, the controller makes the moving mechanism stop the movement of the carriage. The controller turns off the lamp to end reading by the image sensor when the carriage is stopped.

According to another aspect of the present disclosure, a method for controlling an image reading device includes: placing a document to be read on a document stage; radiating light toward the document and the document stage by use of a lamp during document reading; moving the carriage including the lamp, during document reading, from one to the other of two opposite sides of the document stage in a sub scanning direction; reading the document by use of an image sensor based on light from the lamp to generate read image data while the carriage is moving from one to the other side; keeping on the lamp after document reading is started, while the carriage is moving from one to the other side; sensing the edge of the document in the read image data generated while the carriage is moving; recognizing, while the carriage is moving, based on the result of sensing of the edge, that reading of one placed sheet of a document is completed; stopping the movement of the carriage on recognizing once or a plurality of times that the reading of a sheet of the document is completed; and turning off the lamp to end reading by the image sensor when the carriage is stopped.

Further features and advantages of the present disclosure will become apparent from the description of embodiments given below.

DETAILED DESCRIPTION

The present disclosure relates to reducing unnecessary operation and unnecessary electric power consumption when a document smaller than a set reading range is placed. Hereinafter, with reference to FIGS. 1 to 10, an image reading device according to an embodiment will be described. As an image reading device, a multifunction peripheral 100 will be taken as an example in the following description. The multifunction peripheral 100 is capable of printing and transmission based on image data. The multifunction peripheral 100 also is an image forming apparatus.

All the futures in terms of structures and arrangements described in connection with the embodiments are merely examples for the sake of description, and are in no way meant to limit the scope of the disclosure.

Multifunction Peripheral 100

Figure 1:
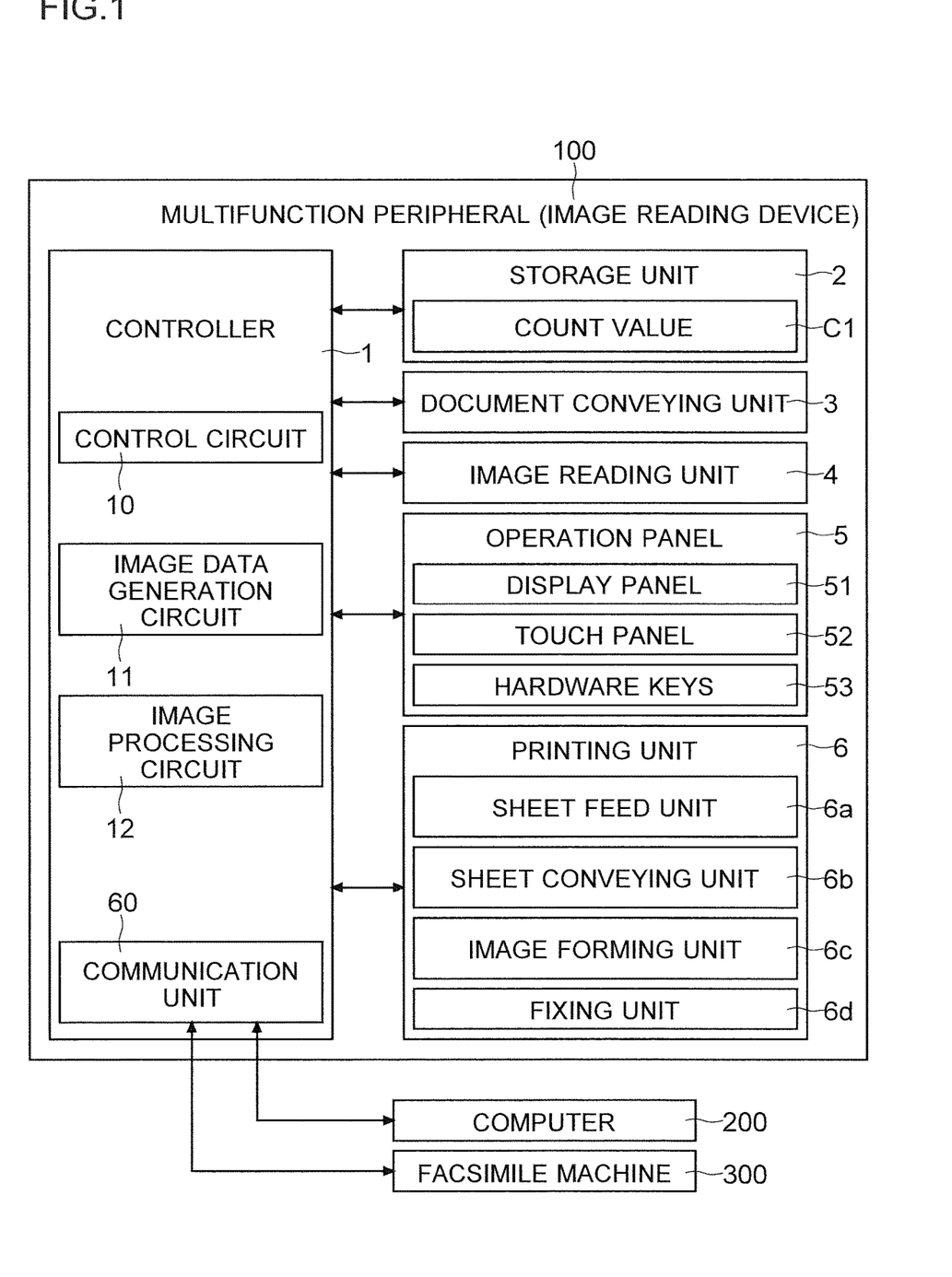
FIG. 1 is a diagram showing an example of a multifunction peripheral according to an embodiment.

With reference to FIG. 1, the multifunction peripheral 100 according to the embodiment will be described. As shown in FIG. 1, the multifunction peripheral 100 includes a controller 1, a storage unit 2, a document conveying unit 3, an image reading unit 4, an operation panel 5, and a printing unit 6.

The controller 1 controls the operation of the multifunction peripheral 100. The controller 1 controls the operation in jobs such as copying and transmission. The controller 1 includes a control circuit 10, an image data generation circuit 11, an image processing circuit 12, and a communication unit 60. The control circuit 10 is, for example, a CPU. The control circuit 10 performs processing and calculation related to jobs. The image data generation circuit 11 processes analog image signals fed out from the image reading unit 4 by reading a document and generates image data. The image processing circuit 12 performs image processing on image data. The image processing circuit 12 is, for example, an ASIC. The storage unit 2 includes a RAM, a ROM, and a storage. The storage is, for example, a HDD or a SSD. The controller 1 controls different blocks based on programs and data in the storage unit 2. The document conveying unit 3 and the image reading unit 4 include a document stage 4b, a lamp 45, and an image sensor 46, and read a document.

The operation panel 5 accepts a user's settings. The operation panel 5 includes a display panel 51 (display), a touch panel 52, and hardware keys 53. The controller 1 makes the display panel 51 display messages and setting screens. The controller 1 makes the display panel 51 display operation images. The operation images are images of, for example, buttons, keys, and tabs. Based on the output of the touch panel 52, the controller 1 recognizes the operation images which have been operated. The hardware keys 53 include a Start key and a numeric keypad. The touch panel 52 and the hardware keys 53 accept a user's operation for making settings (operation related to jobs). For example, the operation panel 5 accepts the setting of a document reading mode. The controller 1 recognizes settings made based on the output of the operation panel 5.

The printing unit 6 includes a sheet feed unit 6a, a sheet conveying unit 6b, an image forming unit 6c, and a fixing unit 6d. In a print job, the controller 1 makes the sheet feed unit 6a feed a sheet. The controller 1 makes the sheet conveying unit 6b convey the sheet. The sheet conveying unit 6b discharges the printed sheet out of the apparatus. The controller 1 makes the image forming unit 6c form a toner image based on image data. The controller 1 makes the image forming unit 6c transfer the toner image to the conveyed sheet. The controller 1 makes the fixing unit 6d fix the transferred toner image to the sheet.

The communication unit 60 includes hardware (a communication circuit) and software for communication. The communication unit 60 communicates with a computer 200 or a facsimile machine 300. The computer 200 is, for example, a PC or a server. The operation panel 5 accepts setting of a destination. The controller 1 makes the communication unit 60 transmit image data based on document reading to the set destination (scanning transmission, facsimile transmission). The communication unit 60 receives print data from the computer 200 or the facsimile machine 300. The controller 1 makes the printing unit 6 print based on the received print data (a print job, facsimile reception and printing).

Document Conveying Unit 3, Image Reading Unit 4

Figure 2:
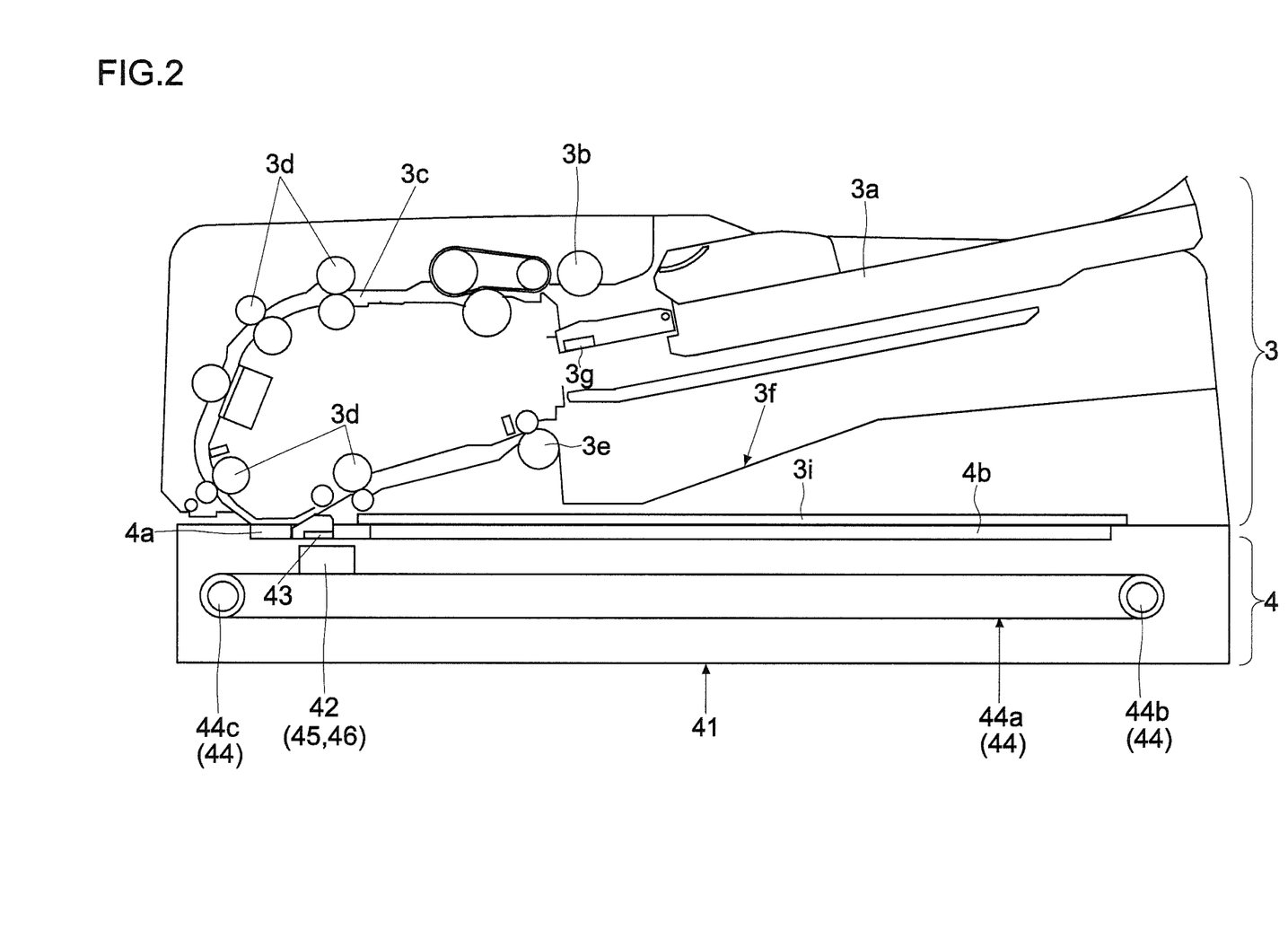
FIG. 2 is a diagram showing an example of an image reading unit according to the embodiment.

Next, with reference to FIGS. 2 and 3, the document conveying unit 3 and the image reading unit 4 according to the embodiment will be described. FIG. 2 is a view, as seen from in front of the multifunction peripheral 100, of the document conveying unit 3 and the image reading unit 4 according to the embodiment.

The document conveying unit 3 conveys a placed document. The document conveying unit 3 may be referred to as DP or ADF. When wising to perform feed reading, a user places a document on the document conveying unit 3. The document conveying unit 3 conveys the placed document one sheet after another. The document conveying unit 3 conveys the document toward a feed-reading contact glass 4a (a reading position). The feed-reading contact glass 4a is arranged on the top face of the image reading unit 4. The feed-reading contact glass 4a is transparent. The image reading unit 4 reads the document conveyed (feed reading).

The document conveying unit 3 includes, from the upstream side in the document conveying direction, a document tray 3a, a feed roller 3b, a document conveying passage 3c, a plurality of conveying roller pairs 3d, a discharge roller pair 3e, and a discharge tray 3f. A document passes through the document conveying passage 3c. The feed roller 3b, the plurality of conveying roller pairs 3d, and the discharge roller pair 3e convey the document, one sheet after another, toward the discharge tray 3f. The document tray 3a is provided with a document placement sensor 3g. The document conveying unit 3 is also provided with a document conveying motor 3h to rotate a rotary member that conveys a document (see FIG. 3).

Figure 3:
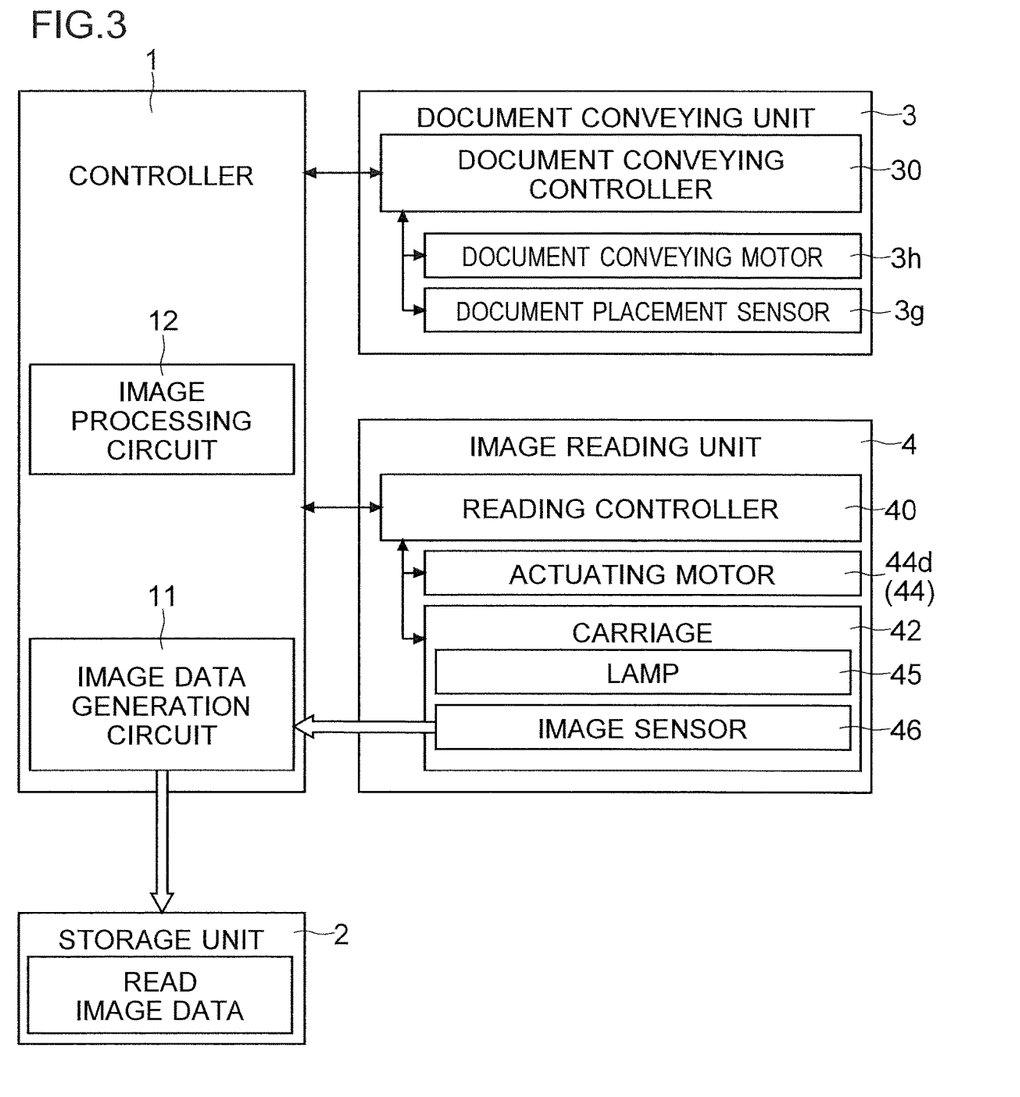
FIG. 3 is a diagram showing an example of the image reading unit according to the embodiment.

As shown in FIG. 3, a document conveying controller 30 is arranged in the document conveying unit 3. The document conveying controller 30 is a board that includes a CPU and a memory. The output of the document placement sensor 3g is fed to the document conveying controller 30. Based on the output of the document placement sensor 3g, the document conveying controller 30 recognizes whether or not a sheet is present on the document tray 3a. The document conveying controller 30 controls document conveying.

Next, the image reading unit 4 will be described. In a right side part of the top face of the image reading unit 4, a document stage 4b (table-reading contact glass) is arranged. The document stage 4b is a transparent plate (glass plate). When table-reading is performed, a user places a document on one face (upper face) of the document stage 4b. For example, a document that cannot be conveyed is placed on the document stage 4b. The document conveying unit 3 can be opened and closed. By closing the document conveying unit 3, it is possible to press a document placed on the document stage 4b. To press a document, a pressing plate 3i is arranged on the bottom face of the document conveying unit 3. The pressing plate 3i is a white plate. The document conveying unit 3 functions also as a document pressing part. FIG. 2 shows a state where the document conveying unit 3 is closed.

As shown in FIG. 3, the image reading unit 4 includes a reading controller 40. The reading controller 40 is a board that controls the operation of the image reading unit 4. The reading controller 40 is a control board that includes a CPU and a memory. The reading controller 40 receives an instruction signal from the controller 1. Based on the instruction, the reading controller 40 controls document reading.

The image reading unit 4 includes, in a housing 41, a carriage 42, a white reference plate 43, and a moving mechanism 44. The moving mechanism 44 includes a belt 44a, a pulley 44b, a pulley 44c, and an actuating motor 44d. The carriage 42 is a scanning unit of a CIS type. The image reading unit 4 may have a scanning unit of a CCD type.

The belt 44a is endless. The belt 44a is wound around the pulleys 44b and 44c. The belt 44a and the carriage 42 are connected together. The actuating motor 44d is arranged in the image reading unit 4 (see FIG. 4). The actuating motor 44d rotates the pulley 44b or the pulley 44c. The actuating motor 44d can rotate forward and backward. When the carriage 42 is moved, the reading controller 40 rotates the actuating motor 44d. This makes the belt 44a move around. As the belt 44a moves around, the carriage 42 moves together in the horizontal direction (the sub scanning direction, the direction perpendicular to the main scanning direction, the left-right direction in FIG. 2). The carriage 42 moves along the other face (on the lower side) of the document stage 4b. Between the document stage 4b and the feed-reading contact glass 4a, the white reference plate 43 is arranged. The home position of the carriage 42 is under the white reference plate 43 (see FIG. 2).

The carriage 42 includes the lamp 45 and the image sensor 46. The carriage 42 also includes a lens that leads reflected light to light receiving elements in the image sensor 46. When document reading is performed, the controller 1 turns on the lamp 45. The lamp 45 irradiates the document stage 4b and the reading target (document) with light. The lamp 45 includes, for example, an LED and a light guide pipe. At one end, or at each end, of the light guide pipe, an LED is attached. The light guide pipe evenly diffuses the light that has entered it through an end part of it in its longitudinal direction (the main scanning direction). The light guide pipe irradiates a document with diffused light. As a light source of the lamp 45, any light source other than an LED can be used.

The image sensor 46 reads a document placed on the document stage 4b or a document conveyed. The image sensor 46 reads a document in color. The image sensor 46 includes a plurality of light receiving elements (photoelectric conversion elements, pixels). The light receiving elements receive the light reflected from the reading target. The reading target is, for example, the white reference plate 43, a document, or the document stage 4b (pressing plate 3i). The light receiving elements are arrayed in a row. The image sensor 46 is a line sensor. The direction in which the light receiving elements are arrayed is the main scanning direction. The light reflected from the reading target strikes the light receiving elements. The light receiving elements each output an analog image signal reflecting the amount of received light (the amount of reflected light). The larger the amount of received light during reading, the larger the analog image signal that the light receiving elements output. Thus, the image sensor 46 performs reading based on light from the lamp 45. The image sensor 46 can be a monochrome line sensor.

The controller 1 (control board) includes an image data generation circuit 11. A cable connects the image sensor 46 and the image data generation circuit 11 together. The image sensor 46 outputs an analog image signal. The analog image signal is transmitted via the cable. Based on the analog image signal fed in via the cable, the image data generation circuit 11 generates image data. The image data generation circuit 11 can be arranged in the image reading unit 4.

The image data generation circuit 11 includes a plurality of circuits. The image data generation circuit 11 includes, for example, an amplification circuit, an ND conversion circuit, and a correction circuit. The amplification circuit amplifies the analog image signal fed out from the image sensor 46. The analog image signal that has undergone amplification is fed to the ND conversion circuit. The ND conversion circuit converts the analog image signal fed to it into a digital image signal. That is, the ND conversion circuit generates image data.

The generated image data is fed to the correction circuit. The image data may include distortion ascribable to the characteristics of the lamp 45, the image sensor 46, and the image data generation circuit 11. The correction circuit is a circuit that corrects distortion. For example, the correction circuit includes a shading correction circuit. The shading correction circuit performs shading correction. The correction circuit may include any other type of correction circuit. The controller 1 makes the storage unit 2 store image data (read image data i1) generated by the image data generation circuit 11.

Placement of Document

Figure 4:
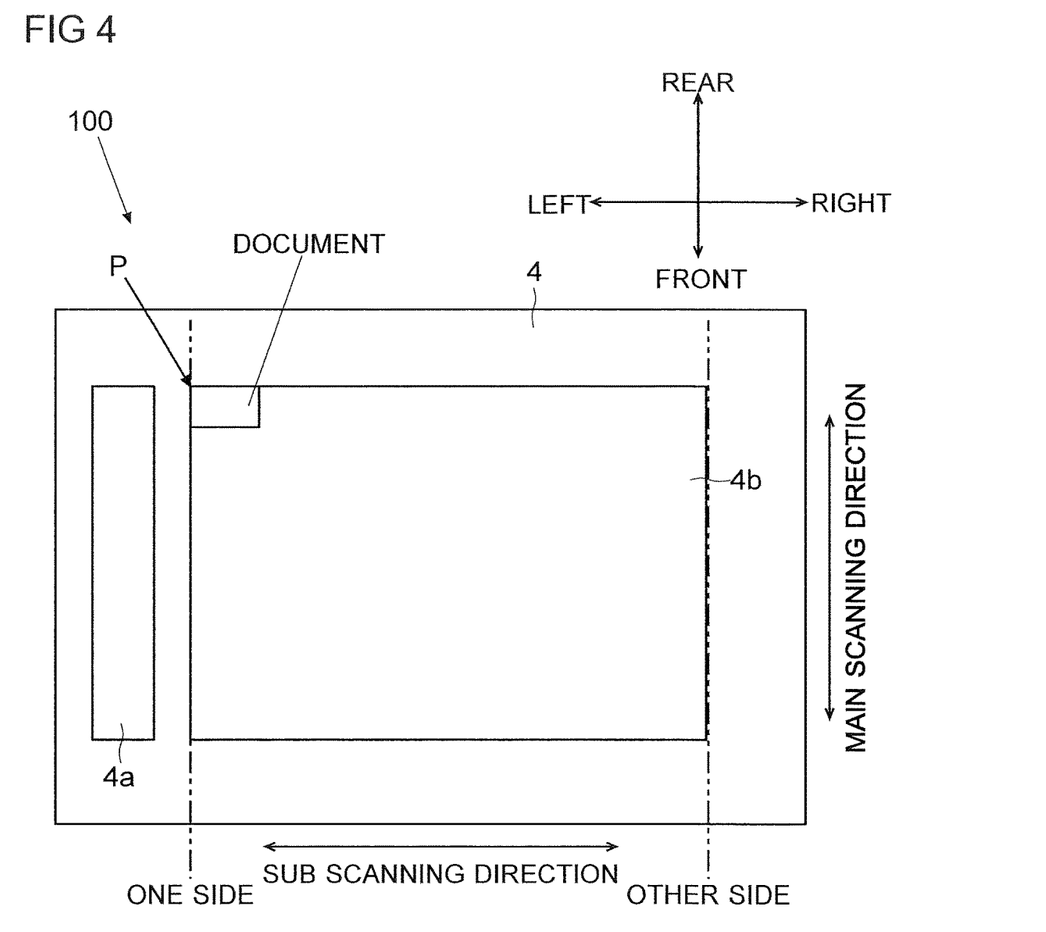
FIG. 4 is a diagram showing an example of placement of a document on a document stage according to the embodiment.

Next, with reference to FIG. 4, an example of placement of a document on the document stage 4b according to the embodiment will be described. FIG. 4 shows an example of a state where the document conveying unit 3 is open. FIG. 4 is a view, as seen from above, of the document stage 4b. A user places a document on the document stage 4b. The user places the document with the to-be-read face down. As shown in FIG. 4, a reference point P is set on the document stage 4b. The reference point P is, as seen from in front of the image reading unit 4 (the multifunction peripheral 100), at the far left corner of the document stage 4b. When the document stage 4b is seen from above, the reference point P is at the upper left corner of the document stage 4b. A user may place a document with the upper left corner of the document aligned at the reference point P. When document reading is performed, the controller 1 makes the moving mechanism 44 move the carriage 42 from one to the other of two opposite sides of the document stage 4b in the sub scanning direction. One of those sides passes through the reference point P.

Choice of Reading Mode

Figure 5:
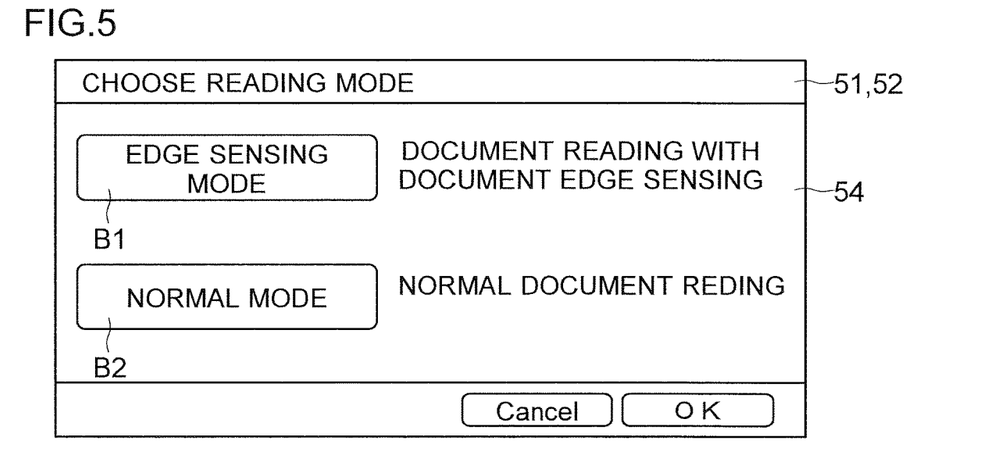
FIG. 5 is a diagram showing an example of a selection screen for reading modes on the multifunction peripheral according to the embodiment.

Next, with reference to FIG. 5, an example of reading modes on the multifunction peripheral 100 according to the embodiment will be described. On the multifunction peripheral 100, as different modes to read a document, an edge sensing mode and a normal mode can be used. When a predetermined operation is performed, the controller 1 makes the display panel 51 display a selection screen 54 for reading modes. FIG. 5 shows an example of this selection screen 54. The operation panel 5 accepts the choice of a mode. In other words, the multifunction peripheral 100 includes an operation panel 5 that accepts the choice of a mode to be used out of the edge sensing mode and the normal mode.

When wishing to read in the edge sensing mode, a user chooses the edge sensing mode on the operation panel 5. Specifically, the user operates an edge sensing mode button B1. When wishing to read in the normal mode, the user chooses the normal mode on the operation panel 5. Specifically, the user operates a normal mode button B2. Based on the operated button, the controller 1 recognizes the mode that is chosen on the operation panel 5.

The edge sensing mode is a mode in which reading of a document is performed to fit the actual size of the document. The edge sensing mode is a mode in which unnecessary electric power consumption and unnecessary operation can be saved. In the edge sensing mode, only table-reading is performed. In the edge sensing mode, the controller 1 (the image processing circuit 12) senses the edge of an image. Edge sensing is processing for sensing, out of image data acquired by reading, a part in which the pixel value changes sharply (discontinuously). The controller 1 performs reading (movement of the carriage 42) and edge sensing at the same time. For example, the controller 1 senses the edge of an image by use of a differential filter.

The normal mode is a mode in which reading of a document is performed irrespective of the actual size of the document. In the normal mode, the controller 1 (the image processing circuit 12) does not sense the edge of an image. The controller 1 makes the image reading unit 4 read a range that is set on the operation panel 5. For example, when A4 size is set as a reading range, the controller 1 makes the image reading unit 4 read the range of A4 size. In the normal mode, when no range is set on the operation panel 5, the controller 1 makes the image reading unit 4 read the range of the maximum size that can be read or the range of a predetermined size.

Reading in Edge Sensing Mode

Figure 6:
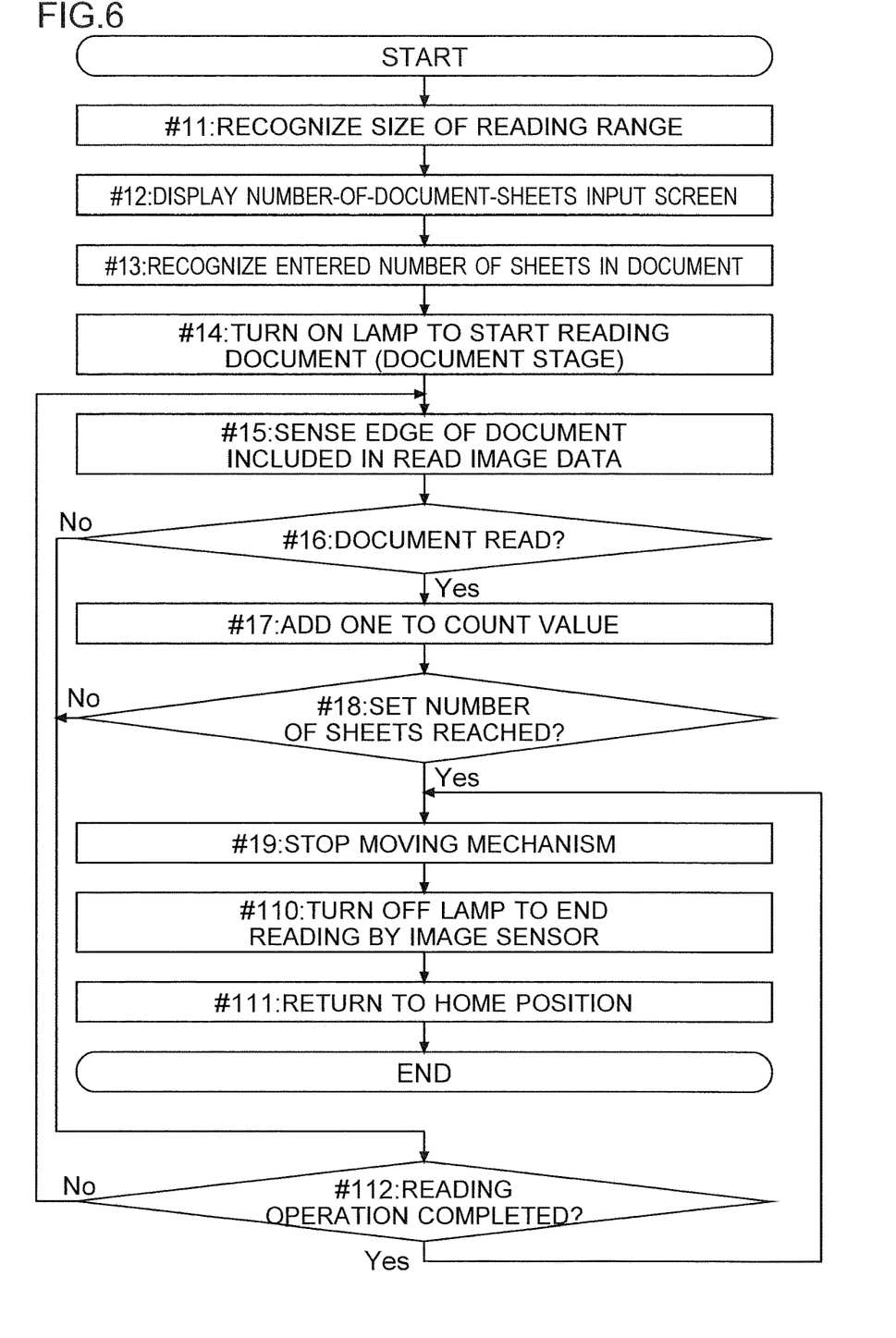
FIG. 6 is a diagram showing an example of the procedure of reading in an edge sensing mode according to the embodiment.
Figure 7:
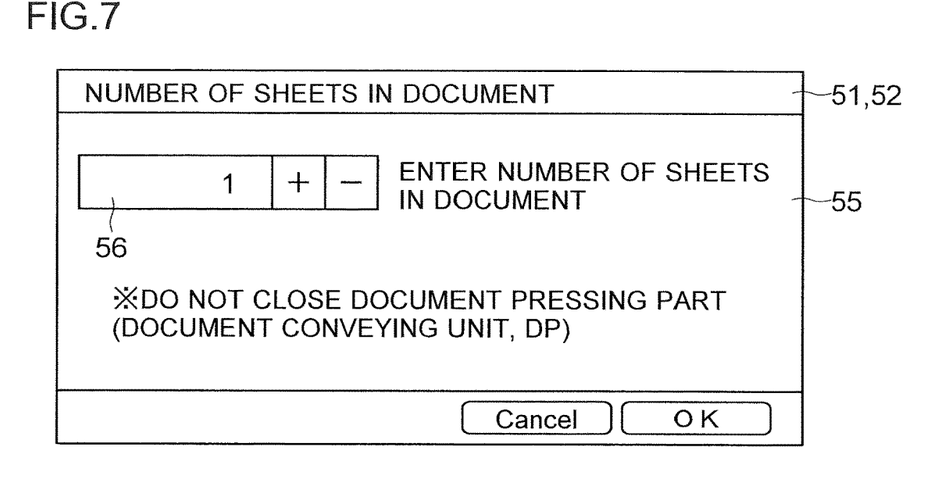
FIG. 7 is a diagram showing an example of a number-of-document-sheets input screen according to the embodiment.

Next, with reference to FIGS. 6 and 7, an example of the procedure of reading in the edge sensing mode according to the embodiment will be described. The procedure in FIG. 6 starts when an instruction to start document reading in the edge sensing mode is entered. When the Start key on the operation panel 5 is operated, the controller 1 recognizes that an instruction to start document reading is entered. Here, a user places a document on the document stage 4b.

First, the controller 1 recognizes the size of a reading range (step #11). When the operation panel 5 has accepted setting of the size of a reading range before the instruction to start document reading, the controller 1 recognizes that the set size is the size of the reading range. For example, when letter size is set as the size of the reading range, the controller 1 recognizes that letter size is the size of the reading range.

On the other hand, when the operation panel 5 has accepted no setting of the size of a reading range before the instruction to start document reading, the controller 1 recognizes that the size of the reading range is the maximum size that can be read. For example, the maximum size that can be read is A3 size.

When the operation panel 5 has accepted setting of the size of a reading range, the controller 1 generates read image data i1 of the set size. When the operation panel 5 has accepted no setting of the size of a reading range, the controller 1 generates read image data i1 of the maximum size that can be read. Setting of a reading range relates to the image data fed out as a result of document reading.

Next, the controller 1 makes the operation panel 5 (the display panel 51) display a number-of-document-sheets input screen 55 (step #12). FIG. 7 shows an example of the number-of-document-sheets input screen 55. The number-of-document-sheets input screen 55 is provided with a number-of-sheets input field 56. A user enters the number of sheets in a document to be placed on the document stage 4b (the set number of sheets) to the number-of-sheets input field 56. The initial value in the number-of-sheets input field 56 is one. When the number-of-document-sheets input screen 55 starts to be displayed, the controller 1 makes the number-of-sheets input field 56 display "1". It is possible to adjust the set number of sheets by use of a plus key and a minus key. Thus, the operation panel 5 accepts input of the set number of sheets in a document on the document stage 4b. Based on the output of the operation panel 5, the controller 1 recognizes the input set number of sheets (step #13).

Then, the controller 1 turns on the lamp 45 and starts to read a document (the document stage 4b) (step #14). The controller 1 moves the carriage 42 from the home position in the sub scanning direction. When document reading is performed, the controller 1 makes the moving mechanism 44 move the carriage 42 from one to the other of two opposite sides of the document stage 4b in the sub scanning direction. The controller 1 moves the carriage 42, in terms of two opposite sides of the document stage 4b in the sub scanning direction, from the one nearer to the reference point P (home position side) to the one farther from the reference point P side (in FIG. 8, from the left side to the right side).

In coordination with the start of reading, the controller 1 (the reading controller 40) makes the image sensor 46 start document reading. While the carriage 42 is moving from one side to the other side, the controller 1 makes the image sensor 46 read a document based on light emitted from the lamp 45. The image sensor 46 repeats reading one line. In coordination with the start of reading, the image sensor 46 outputs an analog image signal. The image data generation circuit 11 generates read image data i1 based on the analog image signal fed out from the image sensor 46.

During document reading (while the carriage 42 is moving, when the lamp 45 is on), the controller 1 (the image processing circuit 12) senses the edge of a document that is included in the read image data i1 generated while the carriage 42 is moving (the read image data i1 immediately after generation) (step #15). In other words, while performing document reading, the controller 1 senses a part where density discontinuities form a continuous line.

For example, the controller 1 takes each pixel in the read image data i1 as a pixel of interest. The controller 1 calculates by use of a filter for edge sensing mainly in the pixel of interest. The filter for edge sensing is, for example, a differential filter or a Laplacian filter. When the pixel of interest is a pixel in a part where density is discontinuous, for example, the controller 1 converts the pixel value of the pixel of interest into a lighter value. When the pixel of interest is a pixel in a part where density changes little, for example, the controller 1 converts the pixel value of the pixel of interest into a darker value. For example, each time image data i1 corresponding to one or a plurality of lines read is generated, the controller 1 performs calculation taking each pixel in the newly generated read image data i1 as a pixel of interest.

After performing filter calculation, the controller 1 binarizes the read image data i1. Thus, the controller 1 generates image data with an emphasized edge (edge-emphasized image data). As document reading proceeds, the controller 1 adds edge-emphasized image data in the sub scanning direction.

Then, while the carriage 42 is moving, the controller 1 (the image processing circuit 12) checks whether or not one placed sheet of a document is read (whether or not the reading of one sheet of a document is completed) (step #16). Specifically, the controller 1 senses a closed edge from the edge-emphasized image data. By sensing a closed edge, the controller 1 recognizes the outline (outer edge) of the sheet of the document. On recognizing the outline of the sheet of the document, the controller 1 recognizes that one placed sheet of the document is read (the reading of the sheet of the document is completed).

In a document, a figure may be drawn. Such a figure may be sensed as a closed edge (outline). To sense the outline of a document accurately, the controller 1 does not recognize a closed edge inside a closed edge as the outline of a document. For example, the controller 1 recognizes a closed edge inside a closed edge in the edge-emphasized image data. The controller 1 may eliminate the inner edge from the edge-emphasized image data.

To sense the edge of a document accurately, in the reading in the edge sensing mode, the controller 1 may suggest that a user not close the document pressing part (the document conveying unit 3). For example, the controller 1 makes the display panel 51 display a message for notifying a user not to close the document pressing part. For example, the controller 1 may make the number-of-document-sheets input screen 55 display the message (see FIG. 7).

When the document pressing part (the document conveying unit 3) is not closed, light emitted from the lamp 45 is not reflected from the pressing plate 3i. Thus, in the part of the document stage 4b where no document is placed, much less light enters the image sensor 46. This makes the pixel values of pixels in a part of the read image data i1 other than a document darker. The controller 1 recognizes the pixel values of the pixels outside the sensed outline in the read image data i1. When the pixel values of the pixels outside the outline are darker values than a previously determined threshold value, the controller 1 may recognize the outline as the outline of the document. When the pixel values of the pixels outside the outline are values equal to or lighter than the previously determined threshold value, the controller 1 may not recognize the outline as the outline of the document (recognize it a figure in the document).

When the controller 1 can recognize that the reading of one sheet of a document is completed with respect to the placed document (step #16, Yes), the controller 1 (the image processing circuit 12) adds one to a count value C1 (see FIG. 1) (step #17). The controller 1 makes the storage unit 2 store the count value C1. The count value C1 indicates how many times, after the reading in the edge sensing mode is started, the controller 1 recognizes that the reading of one placed sheet of the document is completed. The controller 1 counts the number of times. Each time recognizing one placed sheet of the document is read, the controller 1 updates the count value C1.

The controller 1 checks whether or not the set number of sheets out of the document are read (step #18). In other words, the controller 1 checks whether or not the count value C1 has reached the set number of sheets (whether or not the count value C1 is equal to the set number of sheets).

When the count value C1 reaches the set number of sheets (step #18, Yes), the controller 1 makes the moving mechanism 44 stop the movement of the carriage 42 (step #19). In coordination with the stop of the carriage 42, the controller 1 turns off the lamp 45 and ends reading (moving) of the image sensor 46 (step #110). When the set number of sheets out of the document are read, document reading ends. Before the all set reading range is read, document reading ends. It is thus possible to save unnecessary electric power consumption and unnecessary time.

Then, the controller 1 makes the moving mechanism 44 move the carriage 42 toward the home position (step #111). The home position of the carriage 42 is previously determined. The home position is arranged at such a position that the position of the reading line is outside the document stage 4b (under the white reference plate 43). The home position is, in terms of two opposite sides of the document stage 4b in the sub scanning direction, closer to one (the reference point P) than to the other. Thus, document reading in the edge sensing mode is completed (END).

As the document is read, the controller 1 generates read image data i1 of one page. For example, when the operation panel 5 has accepted setting of the size of a reading range, the controller 1 may generate image data in which the read image data i1 is pasted to blank image data of the set size. When the operation panel 5 has accepted no setting of the size of a reading range, the controller 1 may generate image data in which the read image data i1 is pasted to blank image data of the maximum size that can be read.

The generated read image data i1 of one page is used for a job. When the operation panel 5 has accepted setting to perform a copy job, the controller 1 makes the printing unit 6 print based on the read image data i1. When the operation panel 5 has accepted setting to perform a transmission job, the controller 1 makes the communication unit 60 perform data transmission based on the read image data i1.

On the other hand, when the controller 1 cannot recognize that the reading of one sheet of a document is completed (step #16, No), or when the count value C1 has not reached the set number of sheets (when the count value C1 is less than the set number of sheets, step #18, No), the controller 1 checks whether or not reading operation has been completed (step #112). In a case where the operation panel 5 has accepted setting of the size of the reading range, the time of completion of reading operation is the time of completion of reading of the reading range of the set size. When the controller 1 cannot recognize that the set number of sheets out of the document have been read, it makes the image reading unit 4 continue reading the set reading range.

In a case where the operation panel 5 has accepted no setting of the size of the reading range, the time of completion of reading operation is the time of completion of reading of the range of the maximum size that can be read. When the controller 1 cannot recognize that the set number of sheets out of the document have been read, it makes the image reading unit 4 continue reading the range of the maximum size that can be read.

When reading operation has not been completed (step #112, No), the procedure returns to step #15; the reading of the document (the document stage 4b) and edge sensing are continued. On the other hand, when reading operation has been completed (step #112, Yes), the procedure proceeds to step #19.

Specific Examples

Figure 8:
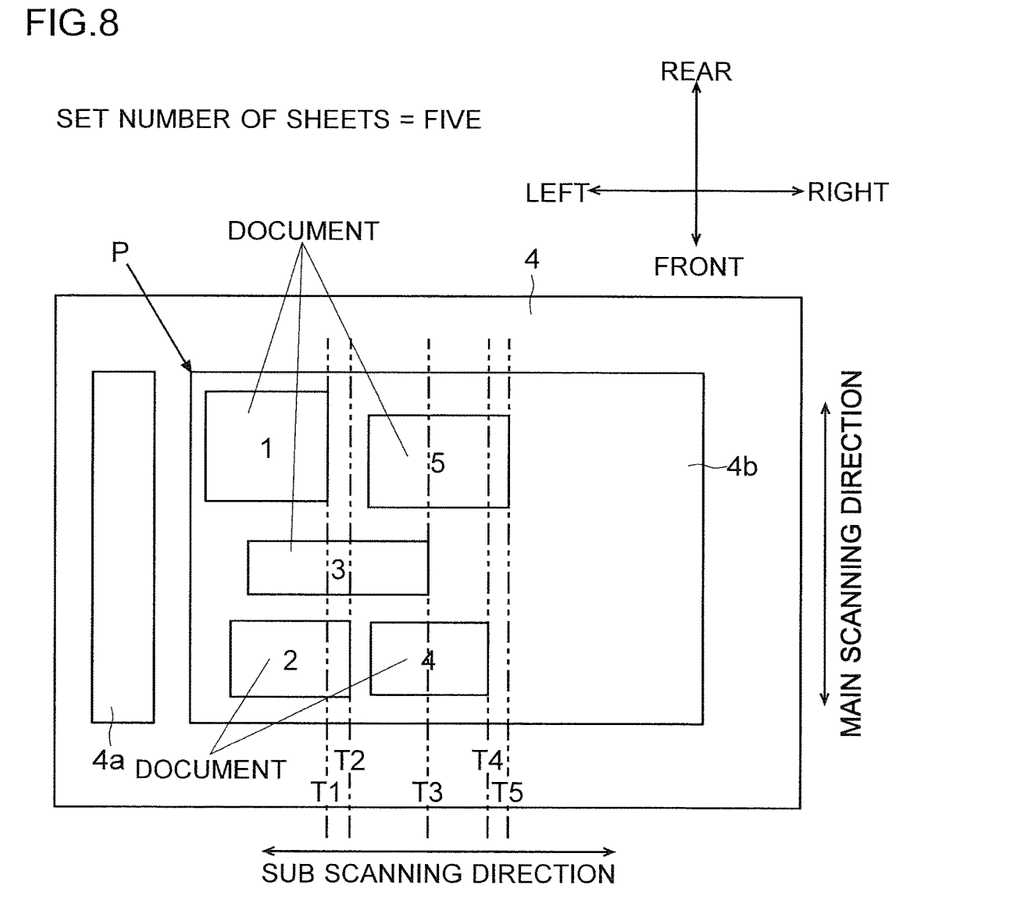
FIG. 8 is a diagram showing a specific example of reading in the edge sensing mode according to the embodiment.

Next, with reference to FIGS. 8 to 10, specific examples of reading in the edge sensing mode according to the embodiment will be described. With reference to FIG. 8, reading in a case where a rectangular document is placed on the document stage 4b will be described. In an example in FIG. 8, the number of sheets set on the number-of-document-sheets input screen 55 is five.

In the multifunction peripheral 100, document reading is started, in terms of two opposite sides of the document stage 4b in the sub scanning direction, from the one (In FIG. 8, the left side) nearer to the reference point P (the home position). The image data generation circuit 11 generates read image data i1 line by line in the main scanning direction. The controller 1 checks, line by line, the read image data i1 generated periodically.

The controller 1 recognizes that a closed edge is the outline of the document. In FIG. 8, based on the read image data i1 acquired by reading with the reading line at the position of T1 in the sub scanning direction, the controller 1 recognizes that the reading of a first sheet of the document is completed. Likewise, based on the read image data i1 acquired by reading with the reading line at the position of T2 in the sub scanning direction, the controller 1 recognizes that the reading of a second sheet of the document is completed. Based on the read image data i1 acquired by reading with the reading line at the position of T3 in the sub scanning direction, the controller 1 recognizes that the reading of a third sheet of the document is completed. Based on the read image data i1 acquired by reading with the reading line at the position of T4 in the sub scanning direction, the controller 1 recognizes that the reading of a fourth sheet of the document is completed. Based on the read image data i1 acquired by reading with the reading line at the position of T5 in the sub scanning direction, the controller 1 recognizes that the reading of a fifth sheet of the document is completed.

In the example in FIG. 8, the set number of sheets entered on the number-of-document-sheets input screen 55 is five. On recognizing that the reading of the fifth sheet of the document is completed, the controller 1 makes the moving mechanism 44 stop the carriage 42. The controller 1 turns off the lamp 45. The controller 1 stops the image sensor 46 (the circuit that makes the image sensor 46 operate). In the example in FIG. 8, when the controller 1 succeeds in recognizing that the fifth sheet of the document has been read, document reading ends. Then, the controller 1 returns the carriage 42 to the home position.

Next, with reference to FIG. 9, reading in a case where a document other than a rectangular document is placed on the document stage 4b will be described. In FIG. 9, the number of sheets set on the number-of-document-sheets input screen 55 is three.

The controller 1 recognizes that a closed edge is the outline of the document. Thus, even if the shape of the document is not rectangular, the controller 1 can recognize the completion of the reading of one sheet of the document. In FIG. 9, based on the read image data i1 acquired by reading with the reading line at the position of T6 in the sub scanning direction, the controller 1 recognizes that the reading of a first sheet of the document is completed. Out of the documents shown in FIG. 9, the document that is the first to be recognized to have been completely read is an oval document.

Figure 9:
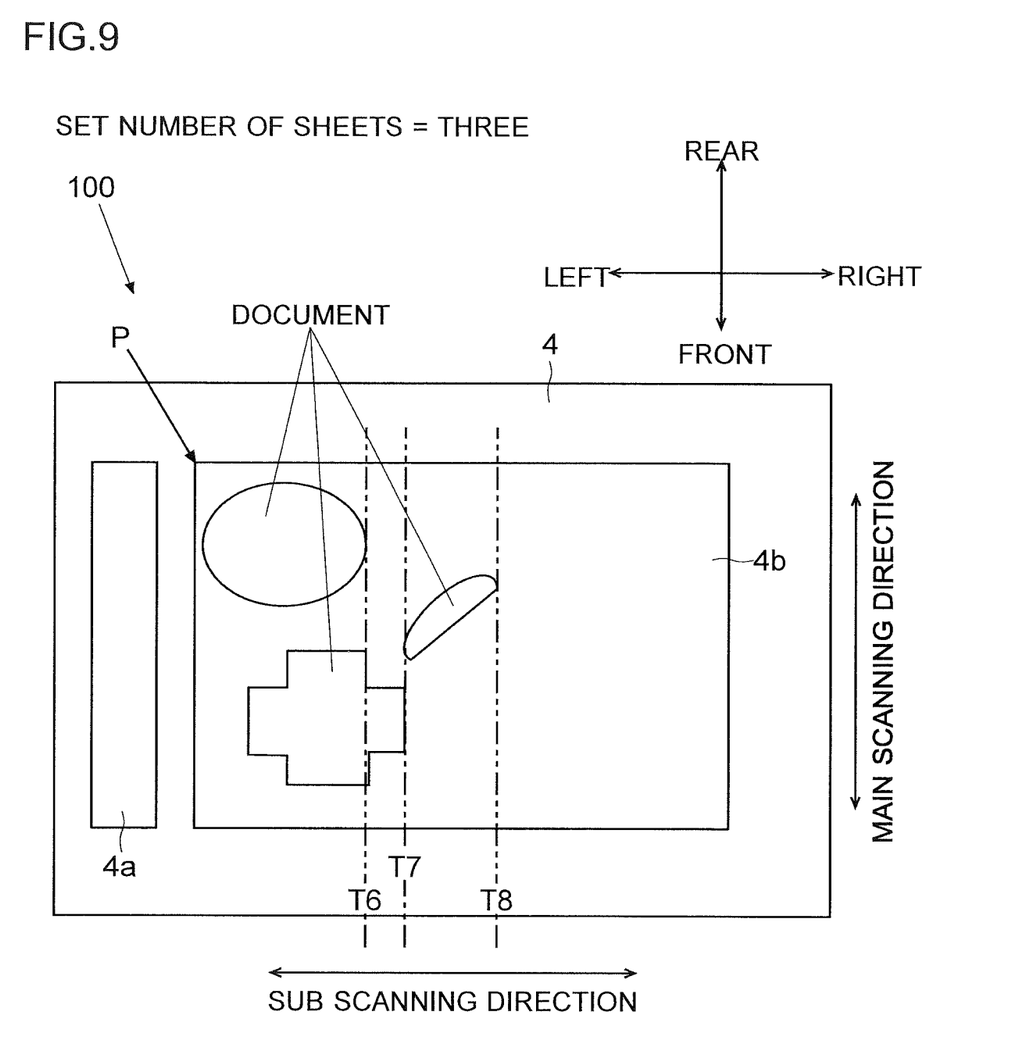
FIG. 9 is a diagram showing a specific example of reading in the edge sensing mode according to the embodiment.

In FIG. 9, based on the read image data i1 acquired by reading with the reading line at the position of T7 in the sub scanning direction, the controller 1 recognizes that the reading of a second sheet of the document is completed. Out of the documents shown in FIG. 9, the document that is the second to be recognized to have been completely read is a cross-shaped document. In FIG. 9, based on the read image data i1 acquired by reading with the reading line at the position of T8 in the sub scanning direction, the controller 1 recognizes that the reading of a third sheet of the document is completed. Out of the documents shown in FIG. 9, the document that is third to be recognized to have been completely read is a document in the shape of an oval cut in half.

In the example in FIG. 9, the set number of sheets entered on the number-of-document-sheets input screen 55 is three. On recognizing that the reading of the third sheet of the document is completed, the controller 1 makes the moving mechanism 44 stop the carriage 42. The controller 1 turns off the lamp 45. The controller 1 stops the image sensor 46 (the circuit that makes the image sensor 46 operate). In the example in FIG. 9, when the controller 1 succeeds in recognizing that the third sheet of the document has been read, document reading ends. Then, the controller 1 returns the carriage 42 to the home position.

Next, with reference to FIG. 10, reading in a case where the number of sheets placed on the document stage 4b is larger than the number of sheets set on the number-of-document-sheets input screen 55 will be described. In an example in FIG. 10, suppose that the number of sheets set on the number-of-document-sheets input screen 55 is three. In the example in FIG. 10, five documents are placed on the document stage 4b.

Consider a case where the actual number of sheets of the document placed on the document stage 4b is different from the set number of sheets entered on the operation panel 5. If the actual number of sheets of the document is larger, when the controller 1 succeeds in recognizing that only the entered set number of sheets out of the document have been read, it ends document reading.

Figure 10:
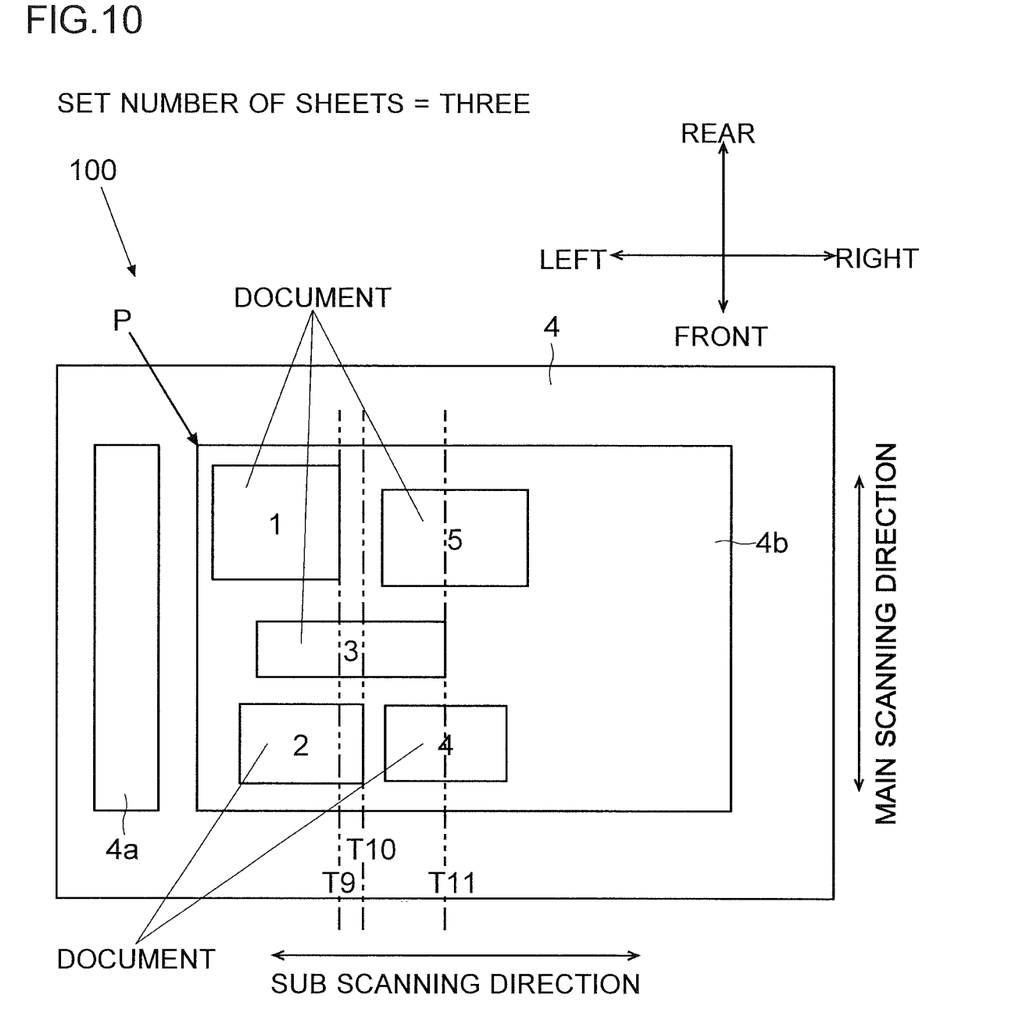
FIG. 10 is a diagram showing a specific example of reading in the edge sensing mode according to the embodiment.

In FIG. 10, based on the read image data i1 acquired by reading with the reading line at the position of T9 in the sub scanning direction, the controller 1 recognizes that the reading of a first sheet of the document is completed. Based on the read image data i1 acquired by reading with the reading line at the position of T10 in the sub scanning direction, the controller 1 recognizes that the reading of a second sheet of the document is completed. Based on the read image data i1 acquired by reading with the reading line at the position of T11 in the sub scanning direction, the controller 1 recognizes that the reading of a third sheet of the document is completed.

When the number of sheets out of the document recognized to have been read reaches the set number of sheets, the controller 1 makes the moving mechanism 44 stop the carriage 42. The controller 1 turns off the lamp 45. The controller 1 stops the image sensor 46 (the circuit that makes the image sensor 46 operate). Not all the document on the document stage 4b has been read. The controller 1 gives priority to the number of sheets set on the operation panel 5.

As described above, the image reading device (the multifunction peripheral 100) according to the embodiment includes a document stage 4b, a carriage 42, a moving mechanism 44, an image sensor 46, an image data generation circuit 11, and a controller 1. On the document stage 4b, a document to be read is placed. The carriage 42 includes a lamp 45 radiating light toward the document stage 4b during document reading. The moving mechanism 44 moves the carriage 42, during document reading, from one to the other of two opposite sides of the document stage 4b in the sub scanning direction. The image sensor 46 reads the document based on light from the lamp 45 while the carriage 42 is moving from one to the other side. The image data generation circuit 11 generates read image data i1 based on an analog image signal fed out from the image sensor 46. After document reading is started, the controller 1 keeps on the lamp 45 while the carriage 42 is moving from one to the other side. The controller 1 senses the edge of the document in the read image data i1 generated while the carriage 42 is moving. The controller 1 recognizes, while the carriage 42 is moving, based on the result of sensing of the edge, that the reading of one placed sheet of the document is completed. The controller 1 makes the moving mechanism 44 stop the movement of the carriage 42 on recognizing once or a plurality of times that the reading of one placed sheet of the document is completed. The controller 1 turns off the lamp 45 to end reading by the image sensor 46 when the carriage 42 is stopped.

Even if a document smaller than the set reading range is placed, when the reading of the document is completed, the movement of the carriage 42 can be stopped. When the reading of the document is completed, the lamp 45 can be turned off and the movement of the image sensor 46 can be stopped. Thus, it is possible to save unnecessary reading operation and unnecessary electric power consumption when a document smaller than the set reading range is placed. It is also possible to shorten the reading time of the document.

The image reading device (the multifunction peripheral 100) also includes an operation panel 5 that accepts setting of the set number of sheets in a document to be placed on the document stage 4b. The controller 1 counts the number of times that the controller 1 recognizes that the reading of one placed sheet of the document is completed while the carriage 42 is moving. The controller 1 makes the moving mechanism 44 stop the movement of the carriage 42 when the count value C1 of the number of times becomes equal to the set number of sheets. If a plurality of sheets of a small document are placed, when the controller 1 succeeds in recognizing that the set number of sheets out of the document has been read, the movement of the carriage 42 can be stopped. When the set number of sheets out of the document has been read, the lamp 45 can be turned off and the movement of the image sensor 46 can be stopped.

The operation panel 5 accepts setting of the size of a reading range. If the count value C1 at the time when the range of the set size has been read is smaller than the set number of sheet, when the reading of the range of the set size is completed, the controller 1 makes the moving mechanism 44 stop the carriage 42. It is possible to keep the movement of the carriage 42 and to keep on the lamp 45 until the controller 1 can recognize that the set number of sheets out of the document has been read. It is possible to set the upper limit of the period of time for which to keep the movement of the carriage 42 and to keep on the lamp 45.

When the operation panel 5 has accepted no setting of the size of a reading range, and if the count value C1 at the time when the range of the maximum size that can be read has been read is smaller than the set number of sheets, the controller 1 makes the moving mechanism 44 stop the carriage 42 when the reading of the range of the maximum size is completed. It is possible to keep the movement of the carriage 42 and to keep on the lamp 45 until the controller 1 can recognize that the set number of sheets out of the document has been read.

The home position of the carriage 42 is previously determined. The home position is arranged at such a position that a position of a reading line is outside the document stage 4b. The home position is a position closer to the one than to the other side. When the movement of the carriage 42 from the one to the other side stops, the controller 1 makes the moving mechanism 44 move the carriage 42 to the home position. When the controller 1 reads the set number of sheets out of the document and stops the carriage 42, it can return the carriage 42 to the home position. In preparation for the subsequent reading, the controller 1 can return the carriage 42. The carriage 42 having stopped at a halfway position is not left as it is.

The controller 1 senses a closed edge to recognize the outline of the document. On recognizing the outline of the sheet of the document, the controller 1 recognizes that the reading of one placed sheet of the document is completed. The controller 1 can accurately recognize that one placed sheet of the document has been read.

The operation panel 5 accepts the choice of an edge sensing mode or a normal mode. When the edge sensing mode is chosen, the controller 1 senses the edge of the document in the read image data generated while the carriage 42 is moving. Based on the result of sensing of the edge, the controller 1 recognizes, while the carriage 42 is moving, that the reading of one placed sheet of a document is completed. On recognizing once or a plurality of times that the reading of a sheet of the document is completed, the controller 1 makes the moving mechanism 44 stop the movement of the carriage 42. When the normal mode is chosen, the controller 1 does not sense the edge of the document in the read image data generated while the carriage is moving. Based on the result of sensing of the edge, the controller 1 does not recognize, while the carriage is moving, that the reading of one placed sheet of the document is completed. Even if the reading of a sheet of the document is completed once or a plurality of times, the controller 1 does not make the moving mechanism 44 stop the movement of the carriage 42. When the reading of the document is completed based on edge sensing, it is possible to choose whether or not the carriage 42 is stopped.

It should be understood that the embodiments of the present disclosure described above are in no way meant to limit its scope; the present disclosure can be implemented with any modifications made without departing from its spirit.

What is claimed is:

1. An image reading device comprising:
    a document stage on which a document to be read is placed;
    a carriage that includes a lamp radiating light toward the document and the document stage during document reading;
    a moving mechanism that moves the carriage, during document reading, from one to an other of two opposite sides of the document stage in a sub scanning direction;
    an image sensor that reads the document based on light from the lamp while the carriage is moving from the one to the other side;
    an image data generation circuit that generates read image data based on an analog image signal fed out from the image sensor; and
    a controller that
    turns on the lamp after document reading is started, while the carriage is moving from the one to the other side,
    senses an edge of the document in read image data generated while the carriage is moving,
    recognizes, while the carriage is moving, based on a result of sensing of the edge, that reading of one placed sheet of the document is completed,
    makes the moving mechanism stop movement of the carriage on recognizing once or a plurality of times that the reading of a sheet of the document is completed, and
    turns off the lamp to end reading by the image sensor when the carriage is stopped.

2. The image reading device according to claim 1, further comprising:
    an operation panel that accepts setting of a set number of sheets in a document to be placed on the document stage,
    wherein
    the controller
        counts a number of times that the controller recognizes that the reading of one placed sheet of the document is completed while the carriage is moving, and
        makes the moving mechanism stop the movement of the carriage when a count value of the number of times becomes equal to the set number of sheets.

3. The image reading device according to claim 2, wherein
    the operation panel accepts setting of a size of a reading range, and if the count value at a time when a range of a set size has been read is smaller than the set number of sheets, the controller makes the moving mechanism stop the carriage when the reading of the range of the set size is completed.

4. The image reading device according to claim 2, wherein when the operation panel has accepted no setting of a size of a reading range, and if the count value at a time when a range of a maximum size that can be read has been read is smaller than the set number of sheets, the controller makes the moving mechanism stop the carriage when the reading of the range of the maximum size is completed.

5. The image reading device according to claim 3, wherein when the operation panel has accepted no setting of a size of a reading range, and if the count value at a time when a range of a maximum size that can be read has been read is smaller than the set number of sheets, the controller makes the moving mechanism stop the carriage when the reading of the range of the maximum size is completed.

6. The image reading device according to claim 1, wherein a home position of the carriage is previously determined, the home position is arranged at such a position that a position of a reading line is outside the document stage, and is a position closer to the one than to the other side, and when the movement of the carriage from the one to the other side is stopped, the controller makes the moving mechanism move the carriage to the home position.

7. The image reading device according to claim 1, wherein the controller senses a closed edge to recognize an outline of the document, and recognizes that the reading of one placed sheet of the document is completed on recognizing the outline.

8. The image reading device according to claim 1, further comprising:

an operation panel that accepts choice of an edge sensing mode or a normal mode, wherein when the edge sensing mode is chosen, the controller senses the edge of the document in the read image data generated while the carriage is moving, recognizes, while the carriage is moving, based on the result of sensing of the edge, that the reading of one placed sheet of a document is completed, and makes the moving mechanism stop the movement of the carriage on recognizing once or a plurality of times that the reading of a sheet of the document is completed, and when the normal mode is chosen, the controller does not sense, while the carriage is moving, the edge of the document in the read image data generated.

9. A method for controlling an image reading device, comprising:

placing a document to be read on a document stage;

radiating light toward the document and the document stage by use of a lamp during document reading;

moving a carriage including the lamp, during document reading, from one to an other of two opposite sides of the document stage in a sub scanning direction;

reading the document by use of an image sensor based on light from the lamp to generate read image data while the carriage is moving from one to the other side;

keeping on the lamp after document reading is started, while the carriage is moving from one to the other side;

sensing an edge of the document in the read image data generated while the carriage is moving;

recognizing, while the carriage is moving, based on a result of sensing of the edge, that reading of one placed sheet of a document is completed;

stopping movement of the carriage on recognizing once or a plurality of times that the reading of a sheet of the document is completed; and turning off the lamp to end reading by the image sensor when the carriage is stopped.

* * * * *